(12) United States Patent
Roy

(10) Patent No.: US 7,143,544 B2
(45) Date of Patent: Dec. 5, 2006

(54) HYDROPONIC GROWING UNIT

(76) Inventor: Rejean Roy, 1379 10th Avenue, Val-David, Quebec (CA) J0T 2N0

( * ) Notice: Subject to any disclaimer, the term of this patent is extended or adjusted under 35 U.S.C. 154(b) by 32 days.

(21) Appl. No.: 10/645,931

(22) Filed: Aug. 22, 2003

(65) Prior Publication Data

US 2005/0039397 A1 Feb. 24, 2005

(51) Int. Cl.
*A01G 31/06* (2006.01)
*A01G 31/02* (2006.01)

(52) U.S. Cl. .......................................... 47/60; 47/62 R

(58) Field of Classification Search ............... 47/60, 47/59 R, 61, 62 R, 63
See application file for complete search history.

(56) References Cited

U.S. PATENT DOCUMENTS

| | | | | |
|---|---|---|---|---|
| 2,928,211 | A | * | 3/1960 | Martin ........................... 47/60 |
| 3,458,951 | A | * | 8/1969 | Martin ........................... 47/60 |
| 3,524,279 | A | | 8/1970 | Adams |
| 3,616,560 | A | * | 11/1971 | Mun ............................. 47/61 |
| 4,218,847 | A | | 8/1980 | Leroux |
| 4,850,135 | A | * | 7/1989 | DeMarco ....................... 47/17 |
| 5,159,779 | A | * | 11/1992 | Johnson ......................... 47/61 |
| 5,228,235 | A | * | 7/1993 | Ishimoto ........................ 47/60 |
| 5,283,974 | A | * | 2/1994 | Graf, Jr. ........................ 47/60 |
| 5,555,676 | A | | 9/1996 | Lund |
| 5,946,853 | A | * | 9/1999 | Jacobs et al. .................. 47/60 |
| 6,061,957 | A | * | 5/2000 | Takashima ................. 47/66.1 |
| 6,067,750 | A | * | 5/2000 | Lai ............................... 47/14 |
| 6,477,805 | B1 | | 11/2002 | Ware |

FOREIGN PATENT DOCUMENTS

| | | | | |
|---|---|---|---|---|
| DE | 3204487 | A | * | 8/1983 |
| JP | 401148131 | A | * | 6/1989 |
| JP | 405007436 | A | * | 1/1993 |
| JP | 405007437 | A | * | 1/1993 |
| JP | 407163253 | A | * | 6/1995 |
| JP | 08266175 | A | * | 10/1996 |
| WO | WO 9526623 | A1 | * | 10/1995 |
| WO | WO03092355 | A1 | * | 11/2003 |

* cited by examiner

*Primary Examiner*—Son T. Nguyen

(57) ABSTRACT

A hydroponic growing unit having a base shaped to hold liquid, the outer periphery of the base defined by an outer, vertical base wall. The unit has a vertical plant support wall forming a generally annular enclosure, the support wall mounted on the wall of the base to extend above the base and to enclose space above the base. There is at least one opening in the support wall providing access to the enclosed space and to the inner surface of the support wall. The opening is normally closed by at least one wall panel forming part of the support wall. The unit has vertical light means mounted in the center of the annular enclosure. Planting block support means are arranged on the inner surface of the support wall near the top and planting blocks, in which plants are planted, are mounted on the support means in a circle to have the plants face the central light means. A watering member is associated with each support means to provide water, pumped from the base, to the top of each block mounted on the support means.

20 Claims, 4 Drawing Sheets

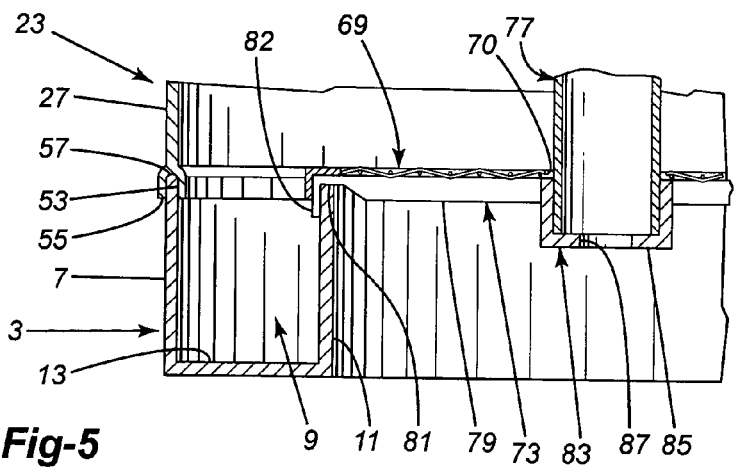
Fig-5
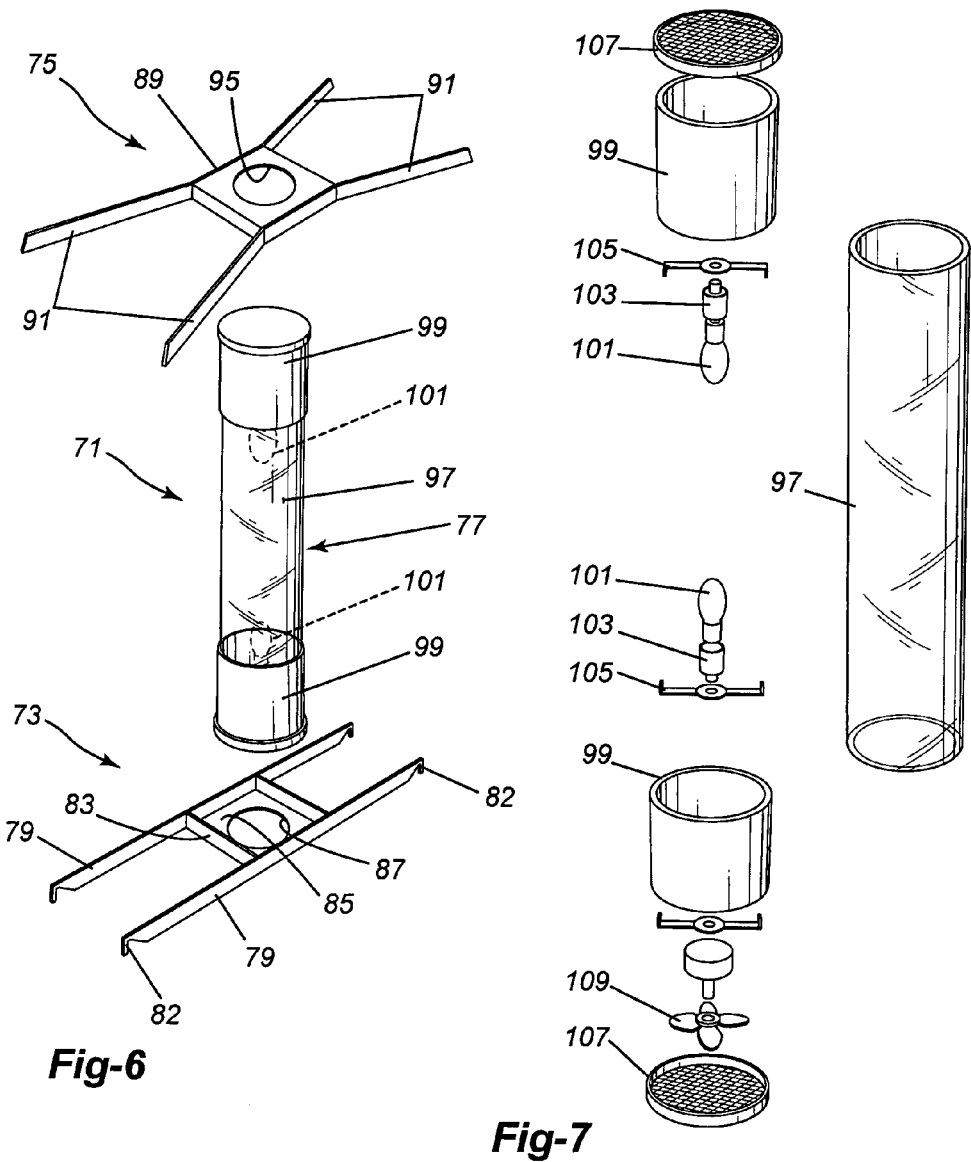
Fig-6
Fig-7

HYDROPONIC GROWING UNIT

BACKGROUND OF THE INVENTION

1. Field of the Invention

This invention is directed toward a hydroponic growing unit. The invention is more particularly directed toward a hydroponic growing unit having a circular, vertical, support wall mounted on a base, the support wall providing support for plants being grown on the inner surface of the support, the base holding liquid for the plants.

2. Description of the Related Art

Hydroponic gardening units are well known. Most of the known units have one or more vertical plant support means mounted on a container or tray which tray holds a liquid for the plants on the support means. the liquid is normally a mixture of water and nutrients. The liquid is pumped from the tray up to the top of the support means from where it trickles down thorough plants growing on the support means back into the tray for recirculation.

The known units work well enough but are not very efficient. Many of the units have only a single column supporting the plants, the plants located on the outside of the column, the column sitting in a container or tray that takes up much more floor space than the column. Also the known units do not make it easy to change the growing medium for the plants, the growing medium often inserted into pockets within the support. Further the known units are not usually equipped with means for facilitating growth such as heat and light. If light is provided, it usually requires lights encircling the unit since the plants are on the outside of the column.

SUMMARY OF THE INVENTION

It is the purpose of the present invention to provide a hydroponic growing unit that grows plants in an efficient and effective manner, and that is easily manageable in planting and harvesting produce grown.

In accordance with the present invention there is provided a hydroponic growing unit having a circular base with a vertical outer wall defining its circular periphery, the base forming a container for liquid. The unit includes a circular, vertical, support wall mounted about the outer wall of the base. The inner surface of the wall supports elongate planting blocks, the blocks in a vertical position and side by side forming a ring within the support wall. Plants are planted in the inside facing surface of the planting blocks thus utilizing substantially all of the area of the inner cylindrical surface of the support wall. One or more openings are provided in the support wall providing access into the space enclosed by the wall and to the inside surface of the wall so as to be able to place the plants within the unit and to be able to tend and harvest the plants being grown. Sections of the support wall close the openings, these sections also supporting planting blocks The growing unit has light means mounted on the base, the light means located in the vertical center of the circular support wall and thus equidistant from each planting block and able to shine on every block within the support wall. Thus all the plants get the same amount of light to grow. The lighting means is also used to circulate and heat air thus heating the environment within the support wall. The growing unit also has watering means for circulating water from the base to the top circular edge of the support wall, then into the top of each planting block, and back to the base from the bottom of each block. Nutrients are added to the water to promote plant growth. Support means are provided for each planting block, the support means used to support each block, from a hook on the support wall, against the inner surface of the wall. The support means makes set-up and take-down of the planting blocks much more simpler and efficient.

The invention is particularly directed toward a hydroponic growing unit having a base with a generally circular outer periphery, the periphery defined by an outer, vertical side wall. The base is shaped to hold liquid. The unit has a vertical plant support wall forming a generally annular enclosure, the support wall mounted on the base wall to extend above the base and to enclose space above the base. There is at least one opening in the support wall providing access to the enclosed space and to the inner surface of the support wall, the opening normally closed by at least one wall panel forming part of the support wall.

The base is preferably in the shape of an annular trough, the trough having inner vertical side wall along with the outer vertical side wall and a bottom wall joining the inner and outer side walls.

The growing unit includes a tubular light means extending up from the base, the light means located in the center of the support wall. The light means comprises a transparent tube having a light source at each end, and light source support means at each end, the light source support means being open to pass air through the tube.

BRIEF DESCRIPTION OF THE DRAWINGS

FIG. 5 is a detail cross-section view taken along line 5—5 in FIG. 4;

FIG. 6 is an exploded, perspective view of the lighting means used in the planting unit;

FIG. 7 is an exploded, perspective view of the light source;

DESCRIPTION OF THE PREFERRED EMBODIMENTS

For the sake of clarity, all the elements of the hydroponic growing unit are not shown in all the views one would normally expect them to appear in. For example, the watering system to be described is not shown in all the views where one would expect to see it.

Figure 1:
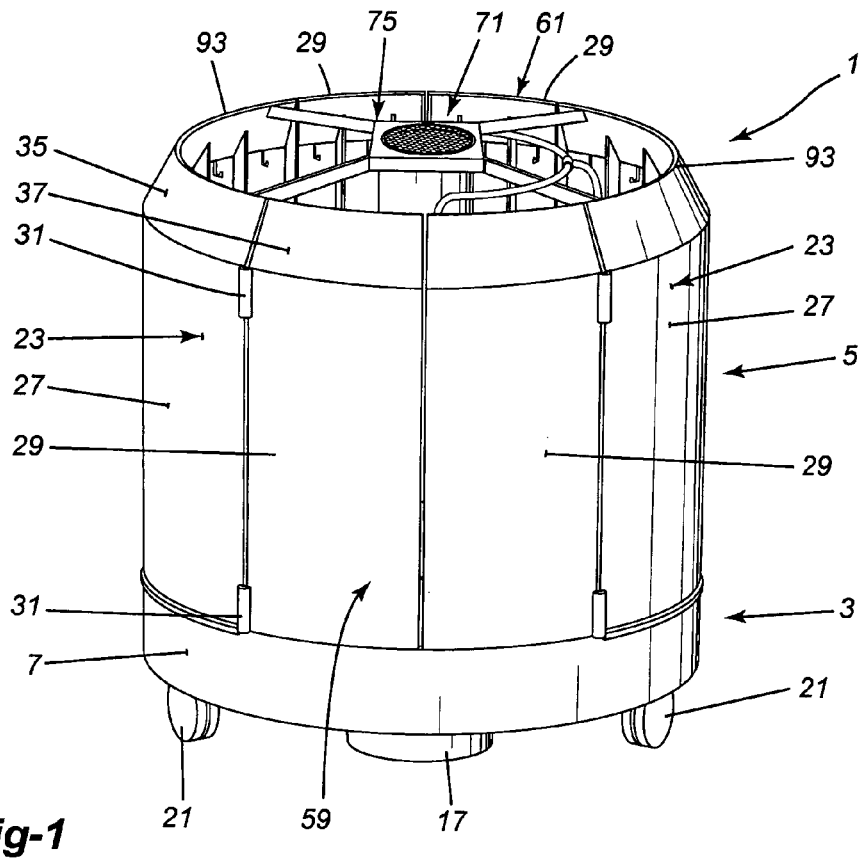
FIG. 1 is a perspective view of the growing unit with the access openings in the support wall closed.
Figure 2:
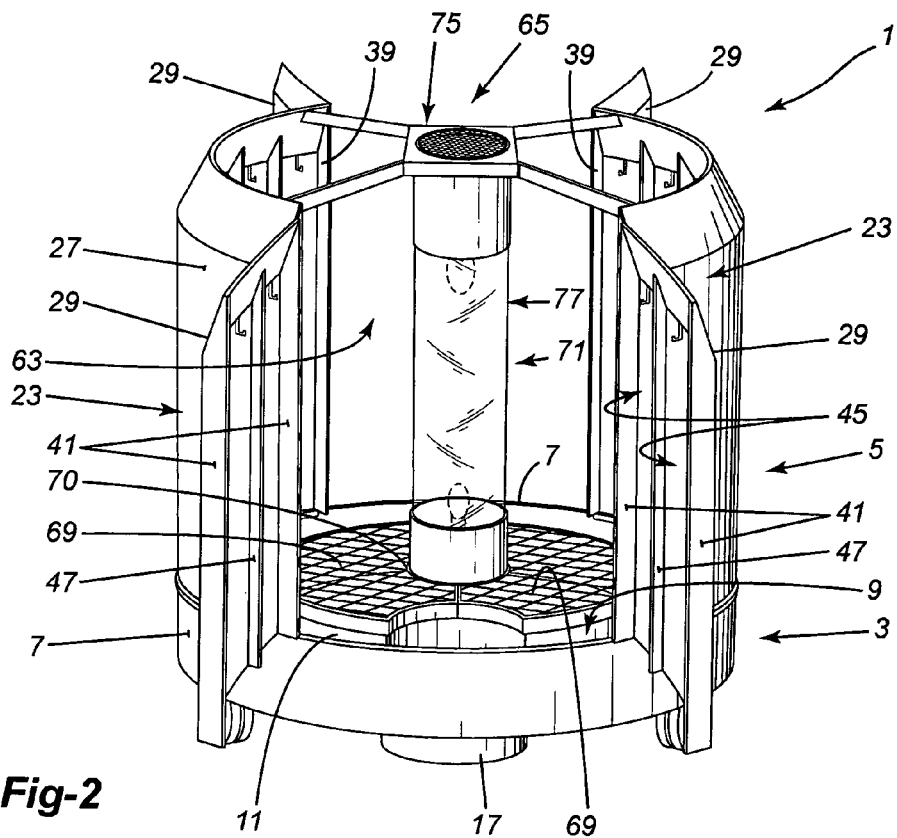
FIG. 2 is a perspective view of the growing unit with the access openings in the support wall open.

The hydroponic growing unit 1, as shown in FIGS. 1 and 2, has a base 3 and a support wall 5 mounted on the base 3. The base 3 is relatively short in height compared to the height of the support wall 5 and is generally circular in shape when viewed from the top. The base 3 is shaped to have an outer vertical side wall 7 defining the circular periphery of the base, and is also shaped to form a container to hold liquid.

Figure 3:
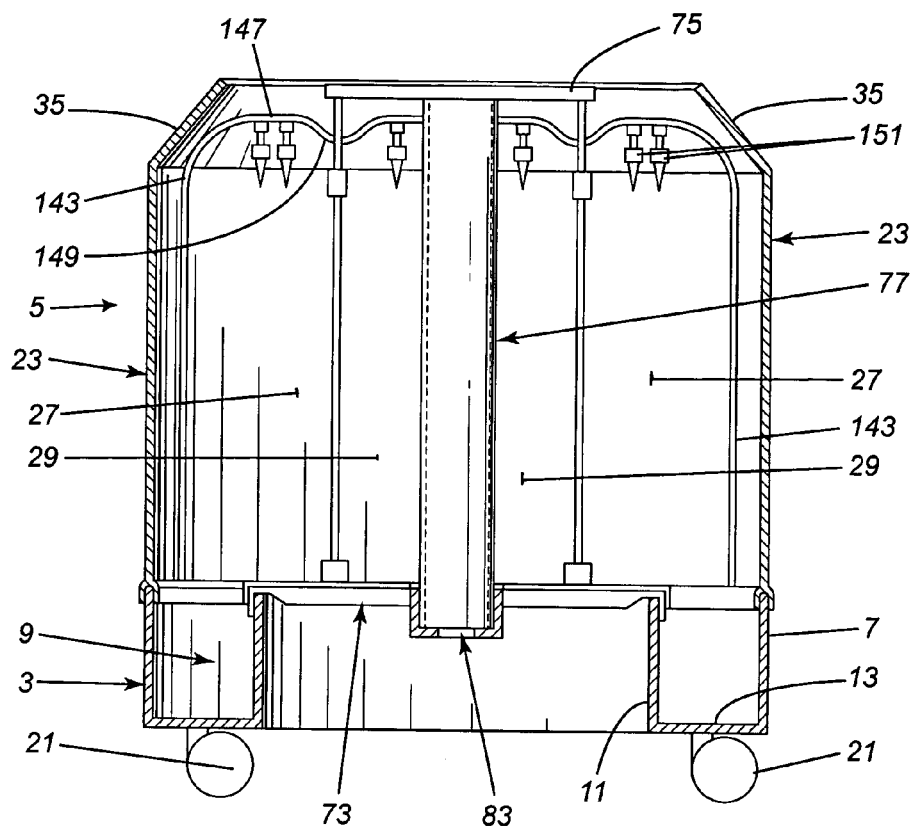
FIG. 3 is a vertical cross-section view of the growing unit with the access openings closed and with a single planting block mounted on the support wall.

In its preferred form, the base 3 is in the shape of an annular trough 9, as shown in FIG. 3, the trough having outer and inner circular, vertical, side walls 7, 11 joined by a bottom wall 13. The trough 9 has a generally circular depression or well 17 formed in the bottom wall 13 in which a pump can be mounted, as will be described. The well 17 is slightly larger in diameter than the width of the trough 9. The inner side wall 11 is bowed outwardly, as shown at 19 in FIG. 4, and both the outer and inner side walls 7, 11 are deepened to form the well 17. The well 17 collects the liquid in the trough 9 and also collects sediment in the liquid. Casters 21 can be mounted on the bottom wall 13 of the trough 9 to make the unit mobile if desired. The casters 21 allow the unit to easily moved once electricity and water lines are disconnected and the trough 9 is emptied. The trough 9 holds liquid used to water the plants grown in the unit. The liquid can be water but is usually water mixed with suitable plant nutrients, the nutrients used dependent on the plants being grown.

Figure 4:
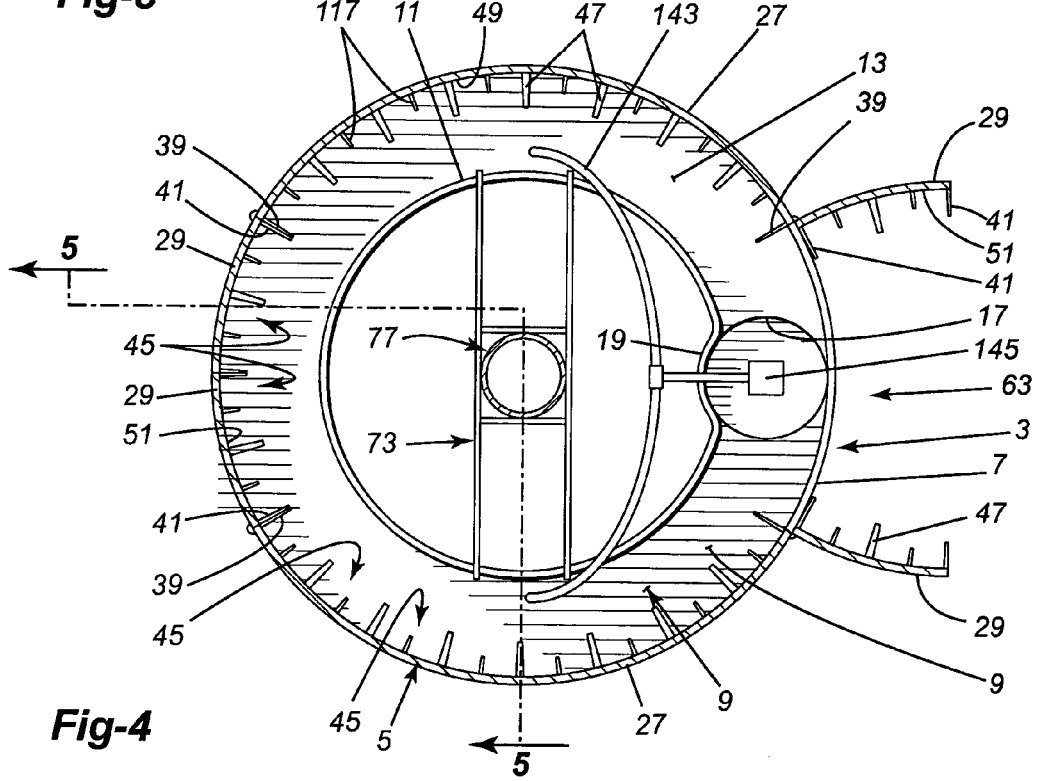
FIG. 4 is a horizontal cross-section view of the growing unit with one access opening closed and the other open.

The support wall 5 is circular and is mounted on the outer side wall 7 of the trough 9. The support wall 5 is made in sections, there being preferably two semi-circular wall sections 23 as shown in FIGS. 1 and 2. Each section is the same so only one will be described in detail. Section 23 has a main central wall panel 27 and two smaller end wall panels 29, each end wall panel 29 hingedly connected, by top and bottom hinges 31, along one side to one side of the main wall panel 27. The end wall panels 29 are slightly shorter than the main panel 27 and form access doors with the end wall panels 29 on the other section 23 to close openings in the support wall 5 as will be described. Each wall panel 27, 29 has short top panels 35, 37 at the top of the wall panels that are angled inwardly toward their top as shown in FIG. 1, and side panels 39, 41 connected to the sides of the wall panels 27, 29 respectively, as shown in FIG. 4, the side panels 39, 41 extending radially inwardly. Each wall panel 27, 29 can also have a number of vertical stalls 45 on its inner surface, the stalls 45 providing locations for plant growing blocks as will be described. The stalls 45 are separated by vertical ribs 47 on the inner surfaces 49, 51 of the wall panels 27, 29. The stalls 45 are partly covered with the top panels 35, 37. While the use of stalls has been described, the unit can be use without stalls.

The two wall sections 23 are mounted on the upper edge 53 of the outer wall 7 of the base 3. The bottom edge 55 of the main panel 27 in both sections 23 has a groove 57 formed therein for snugly receiving top edge 53 of the outer base wall 11 as shown in FIG. 5. The wall sections 23 are long enough to form the closed, circular, support wall 5 on the base 3. The end panels 29 of one of the two sections 23 cooperate with the end panels 29 of the other section to form a pair of diametrically opposed closures 59, 61 in the support wall 5 as shown in FIGS. 1 and 4. Suitable closure means (not shown) connect the adjacent end panels 29 of the wall sections 23 together. The closures 59, 61 close diametrically opposed openings 63, 65 in the support wall 5, the openings 63, 65 extending between the ends of the central wall panels 27 when the closures 59, 61 are open. The openings 63, 65 provide access to the enclosed growing space within the circular support wall 5 and to the circular inner surface 67 of the support wall 5 which inner surface 67 is formed by the inner surfaces 49, 51 on the wall panels 27, 29 respectively. The well 17 in the trough 9 is preferably located at one of the openings 63, 65 so a pump in the well can be easily serviced and nutrients can be added to the liquid in the well. Two half circular screen sections 69 can close the open space in the center of the annular trough if desired, the screen sections 69 mounted on their curved periphery on the top edge of the inner wall 11 of the trough 9. The screen sections 69 are formed to define a small central circular opening 70.

While unit has been described with a support wall 5 made from two identical half circular wall sections 23, the support wall could be constructed in other ways. For example, one wall section could be provided with a central main wall panel as before but with two end wall panels, each large enough alone to close an opening 63, 65. The other wall section would only have the central main wall panel without any end panels and would be shorter than the one wall section. The end wall panels on the one section would connect with the ends of the main wall panel on the other section to close the openings 63, 65 to from the closed support wall 5. In another embodiment, smaller units could employ a support wall with just one opening therein. The support wall would comprise just one wall section composed of one main wall panel and two end wall panels, one at each end of the main wall panel, for closing the opening. The two end wall panels could be replaced by one end wall panel for closing the opening.

The unit 1 has vertical lighting means 71 mounted on the base 3 within the enclosure formed by the support wall 5 as shown in FIGS. 6 and 7. The lighting means 71 are located centrally of the support wall 5 as shown in FIGS. 1 and 4. The lighting means 71 can comprise a bottom light support 73, a top light support 75 and a light source 77. The bottom light support 73 has a pair of parallel arms 79 dimensioned to extend diametrically across the inner circular wall 11 of the trough 9, the arms 79 fastened onto the top edge 81 of the inner wall 11 by hooks 82 or the like. The arms 79 carry a bottom receptacle 83, centrally located on the arms 79, for supporting the bottom end of the light source 77. The bottom wall 85 of the receptacle 83 has a central opening 87 therein. If the screen sections 69 are used, the bottom light support 73 is mounted just under the screen sections with the bottom receptacle 83 aligned with the opening 70 defined by the screen sections as shown in FIG. 5.

The top light support 75 has a top receptacle 89 for receiving the top end of the light source 77 with arms 91 extending radially therefrom to connect to the top edge 93 of the main wall panels 27 with hooks or the like (not shown). The top of the top receptacle 89 is open as shown at 95. The top light support 75 helps to support the main, central, wall panels 27 in position on the base 3.

The light source 77 comprises a clear support tube 97 having light bulb supports 99 at its ends, the light bulb supports 99 each supporting a light bulb 101 within the ends of the tube 97. The light bulb supports 99 are preferably open to the passage of air with the light bulb socket 103 being held by a diametrical arm 105 passing across the support 99. The ends of the supports 99 can be closed by screens 107 allowing air to pass through the tube 97 but preventing insects from entering the tube. The open receptacles 83, 89; the open light bulb supports 99; and the closure end screens 107 allow air to pass upwardly through the tube 97 by convection. The passing air cools the light bulbs 101 and the heated air emerging from the top of the tube 97 heats the air in the enclosure within the support wall 5. If desired, a small fan 109 could be mounted in the bottom light bulb support 99, the fan 109 drawing air from beneath the base 3 up through the tube 97 to cool the light bulbs, to heat the air in within the support wall, and to even ventilate the space within the support wall. If the screen sections 69 are used, the support tube 97 passes through the central opening 70, the screen sections 67 resting on the bottom light support 73.

While one preferred vertical lighting means 71 has been described, other types of vertical lighting means can be used. The lighting means could, for example, comprise two elongated fluorescent light bulbs mounted back to back on a vertical support stand, the support stand being free standing on the floor in the middle of the base and more particularly in the middle of the support wall.

Figure 8:
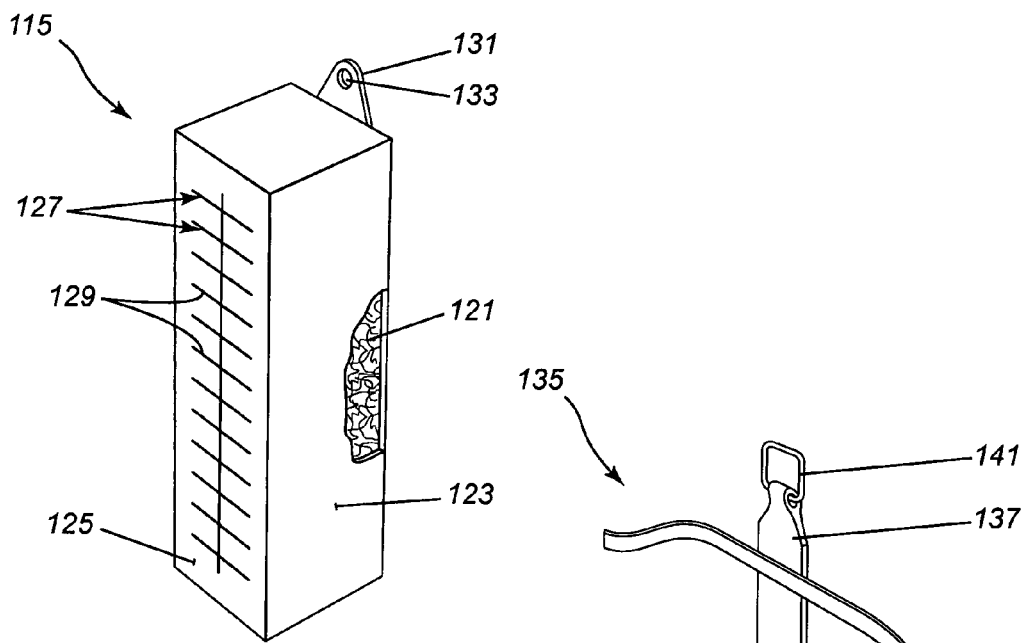
FIG. 8 is a perspective view of the planting block.
Figure 9:
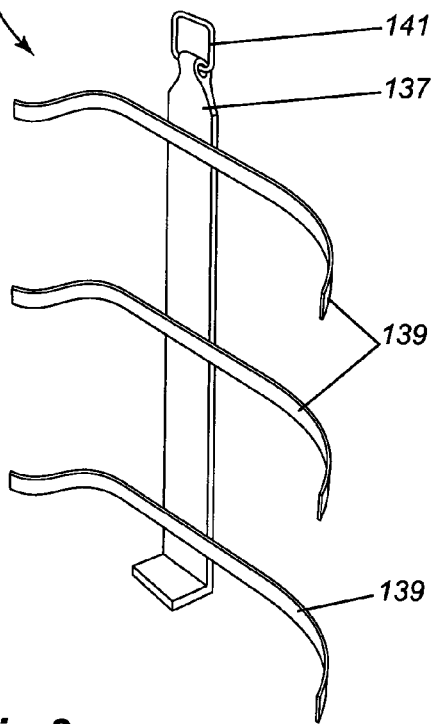
FIG. 9 is a perspective view of the planting block support means.
Figure 10:
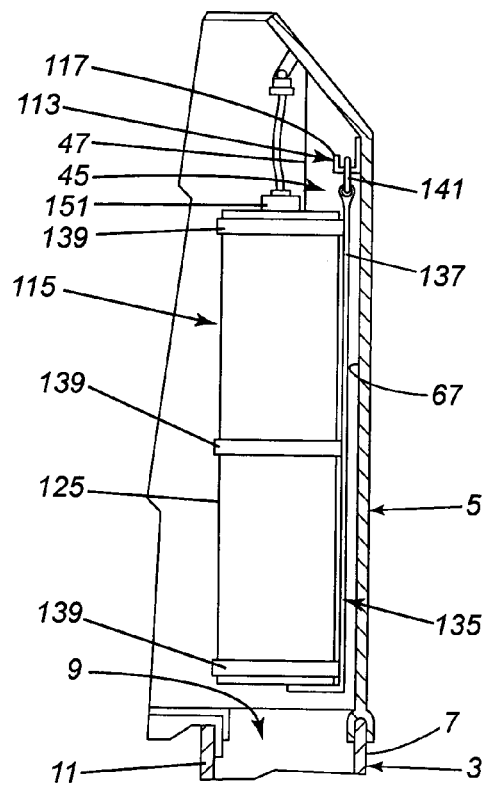
FIG. 10 is a detail cross section view of a block mounted on the block support which in turn is mounted on the support wall.

Mounting means 113 are provided for mounting planting blocks 115 of plant growing material inside the support wall 5 as shown in FIGS. 8 to 10. The block mounting means 113 comprise a hook 117 in each stall 45, the hooks located at the top of the stalls, and on the inner surface 67 of the support wall 5. The hooks 117 are arranged in a circle about the light source 77, and are equally spaced apart.

The planting blocks 115 are in the form of an elongate, parallelepiped member and have an inner mass 121 of suitable plant growing material surrounded by outer cover 123 which cover retains the shape of the block. The growing material can be any well known synthetic or organic growing material. Cotton, by way of example, is a suitable growing material. The cover 123 can be of made from any suitable plastic material, such as a polyethylene film, that can be wrapped about the growing material. The inner side 125 of the block 115, which side faces the light source 77 when the block is mounted on the support wall 5, has openings 127 in the cover 123 through which openings 127 plants can be planted into the growing material in the block. The openings 127 can in the form of vertically spaced-apart horizontal slits 129 formed in the cover 123. While the block has been described as a parallelepiped, it can other shapes as well. Elongated blocks with cross-sectional shapes such as oval or hexagonal can be-used as well.

The outer cover 123 of the planting block 115 can be formed to have a mounting tab 131 extending up from the back of the block, above the top of the block, as shown in FIG. 10. The tab 131 can have a hole 133 therein by means of which the tab 131 and thus the block 115 is supported from one of the hooks 117 on the inner surface 67 of the support wall 5.

Instead of the tab 131, a support member 135 can be provided to hang the block 115 from the hook 117. The support member 135 can have a rigid spine 137 with flexible straps 139 mounted along the length of the spine 137 at spaced-apart locations, the straps to extend transverse to the spine, as shown in FIG. 9. A ring 141 is provided at the top of the spine 137. A block of planting material is held against the spine 137 by the straps 139 wrapped about the block with their ends fastened together, as shown in FIG. 10. The block is sized to fit snugly within a stall 45 on the inner surface 67 of the support wall 5, extending substantially over the height of the wall. While the spine 143 has been specified as rigid, it could also be relatively soft and flexible.

The unit has a watering system for supplying liquid to the top of the blocks to provide both water and nutrients for the plants carried by the blocks. The watering system, as shown in FIGS. 3 and 4 can include delivery lines 143 carrying water from a pump 145 in the well 17 up to water distribution lines 147 mounted near the top of the wall panels 27, 29 in the wall sections 23 forming the support wall 5. The distribution lines 147 can have a flexible loop section 149 allowing the end wall panels 29 to open from the central wall panels 27. The lines 147 distribute water to water metering members 151, one member 151 inserted into the top of each planting block. The metering members 151 feed liquid into the top of the block and the liquid slowly passes down the block through the planting material bringing water to the plants inserted part way into the block. Excess liquid passes out the bottom of the block, through an opening formed in the cover 123, into the base 3 and is recycled by the pump 145. Suitable filters, not shown, can be provided at strategic locations in the lines in the watering system.

The planting blocks 115 are mounted in the stalls 45 on the inner face 67 of the support wall 5 with the block mounting means 135. The blocks 115 are vertical and parallel, closely adjacent to each other, and form a substantially closed ring about the light source, the blocks generally equidistant from the light source. Each block has a vertical row of plants projecting inwardly from the inner face 125 of the block, the plants inserted into the block through the openings 127. Access for mounting the blocks 115 is provided through the openings 63, 65 in the support wall 5. The closures 59, 61 in the wall 5 allow access into the interior of the enclosure so as to be able to change growing blocks 115 when needed, and/or to harvest the plants. The circular support wall protects the plants from physical damage and provides a somewhat closed and controllable growing environment.

A plurality of the units could be hooked up together to form a larger commercial growing operation. Piping could be provided from a common liquid source to service each unit and ducting could be provided from each unit to a common fan to draw air through the light sources and to collect the heated air for heating purposes. Units can be easily hooked into or unhooked from the system and moved into other areas on the wheels carried by the base as required.

The base 3 has been described as being circular and preferably in the form of an annular trough. However the base have other shapes as well. The base could, for example, be square with one side of the square generally equal in length to the diameter of the support wall, the square base being in the shape of a shallow container having a base and four side walls with the circular support wall mounted on the center of each of the four side walls of the square base.

I claim:

1. A hydroponic growing unit having: a base, the outer periphery of the base defined by an outer, vertical, base wall, the base shaped to hold liquid; a vertical, plant support wall mounted on the base wall to extend above the base and to enclose a cylindrical space above the base, at least one opening in the support wall providing access to the enclosed space and to the inner surface of the support wall; the support wall having at least one wall panel movable to selectively open or close the opening, the remainder of the support wall stationary on the base; and spaced-apart, mounting means, for use in mounting growing plants in the unit, on the inner surface of the support wall, including the wall panel wherein all the mounting means are located near the top of the support wall and arranged in a circle about the support wall.

2. A unit as claimed in claim 1 wherein the base is in the shape of an annular trough, the trough having inner and outer vertical side walls and a bottom wall joining the side walls with the outer side wall of the trough forming the base wall.

3. A unit as claimed in claim 2 wherein the trough has a well formed therein for collecting the liquid in the trough, the well sized to receive a pump for pumping liquid from the well.

4. A unit as claimed in claim 1 including a watering inlet associated with each mounting means, each watering inlet supported by the top of the support wall and connected via tubing, and a pump in the well, to the liquid in the base.

5. A unit claimed in claim 1 including a watering inlet associated with each mounting means, each watering inlet supported by the of the support wall and connected via tubing, and pump in the well, to the liquid in the base.

6. A unit claimed in claim 1 including a growing block suspended from each mounting means, the block comprising plant growing material encased in a cover, the block extending generally over the height of the support wall and having an inner surface facing inwardly toward the center of the support wall, the cover on the inner surface having openings providing access to the growing material within the cover, the openings permitting the plants to be planted in the growing material.

7. A unit as claimed in claim 1 including a growing block suspended from each mounting means, the block comprising plant growing material encased in a cover, the block extending generally over the height of the support wall and having an inner surface facing inwardly toward the center of the support wall, the cover on the inner surface having openings providing access to the growing material within the cover, the openings permitting the plants to be planted in the growing material.

8. A unit as claimed in, claim 1 wherein the support wall has two diametrically opposed openings therein, each opening closed by two end wall panels, each end wall panel hinged to the support wall, the end wall panels forming part of the support wall when closed.

9. A unit as claimed in claim 1 wherein the support wall has two diametrically opposed openings therein, each opening closed by two end wall panels, each end wall panel hinged to the support wall, the end wall panels forming part of the support wall when closed.

10. A unit as claimed in claim 1 wherein the base is in the shape of an annular trough, the trough having inner and outer vertical side walls and a bottom wall joining the side walls with the outer side wall of the trough forming the base wall.

11. A unit as claimed in claim 10 wherein the trough has a well formed therein for collecting the liquid in the trough, the well sized to receive a pump for pumping liquid from the well.

12. A unit as claimed in claim 1 including lighting means mounted on the unit in-the axial center of the cylindrical space.

13. A unit as claimed in claim 12 wherein the lighting means has a light source, the light source comprising transparent tube open at both ends, the transparent tube having a light source at each end, and light source support means at each end, the light source support means being open to pass air through the lighting means.

14. A unit as claimed in claim 13 including a ventilating fan at the bottom of the tube for drawing air into the tube to heat it and to cool the light sources, the air emerging from the top of the tube into the enclosure to provide heat to the plants growing in the enclosure.

15. A unit as claimed in claim 13, including a top light support mounted on the top of the air support wall and supporting the top end of the tube centrally within the support wall.

16. A unit as claimed in claim 12 wherein the lighting means comprises a transparent light tube open at both the top and bottom, and at least one light source in the tube.

17. A unit as claimed in claim 16 including a ventilating fan at the bottom of the tube for drawing air into the tube to heat the air and to cool the light source, the emerging from the top of the tube into the cylindrical space to provide heat to plants growing in the growing blocks within the space.

18. A unit as claimed in claim 1 including lighting means mounted on the unit in the axial center of the cylindrical space.

19. A unit as claimed in claim 18 wherein the lighting means comprises a transparent light tube open at both the top and bottom, and at least one light source in the tube.

20. A unit as claimed in claim 19 including a ventilating fan at the bottom of the tube for drawing air into the tube to heat the air and to cool the light source, the air emerging from the top of the tube into the cylindrical space to provide heat to plants growing in the growing blocks within the space.

* * * * *